(12) United States Patent
Aggarwal

(10) Patent No.: US 8,820,074 B2
(45) Date of Patent: Sep. 2, 2014

(54) SYSTEM AND METHOD TO GENERATE ENVIRONMENT-FRIENDLY POWER BY TAPPING SOLAR ENERGY

(76) Inventor: Abhinav Aggarwal, Chapel Hill, NC (US)

( * ) Notice: Subject to any disclaimer, the term of this patent is extended or adjusted under 35 U.S.C. 154(b) by 104 days.

(21) Appl. No.: 11/308,204

(22) Filed: Mar. 11, 2006

(65) Prior Publication Data

US 2007/0209364 A1  Sep. 13, 2007

(51) Int. Cl.
*F03G 6/00* (2006.01)
(52) U.S. Cl.
USPC .................................... 60/641.11; 60/641.15
(58) Field of Classification Search
USPC ........................................ 60/641.8–641.15
See application file for complete search history.

(56) References Cited

U.S. PATENT DOCUMENTS

| 3,822,692 | A | * | 7/1974 | Demarest | 126/591 |
| 4,191,901 | A | * | 3/1980 | Branover | 310/11 |
| 7,089,740 | B1 | * | 8/2006 | Ou | 60/641.8 |

* cited by examiner

*Primary Examiner* — Hoang Nguyen

(57) ABSTRACT

The system and method to generate electricity from solar energy by multi-tired solar lenses powering a steam-turbine. An insulated container mounted with convex-lenses emits steam to impact turbine blades. Over the greater solar catchment's area in the space around, larger convex lenses gather solar energy and focus beam to smaller convex lenses mounted on the container. There are various levels of lens placement acting as energy amplifiers to super-heat water inside the container. The steam passes through a directed jet nozzle, releasing to impact the turbine blades. A generator coupled to turbine shaft produces electricity. The steam, upon utilization and condensation is recycled, while still hot, to the container. On a small scale, it can be used as a supplementary power source to solar panels. Larger turbines can be placed anywhere, including offshore platforms, to tap large catchments area using multi-layered hierarchy of convex lenses.

15 Claims, 4 Drawing Sheets

*Steam Generation Chamber and Turbine Arrangement*

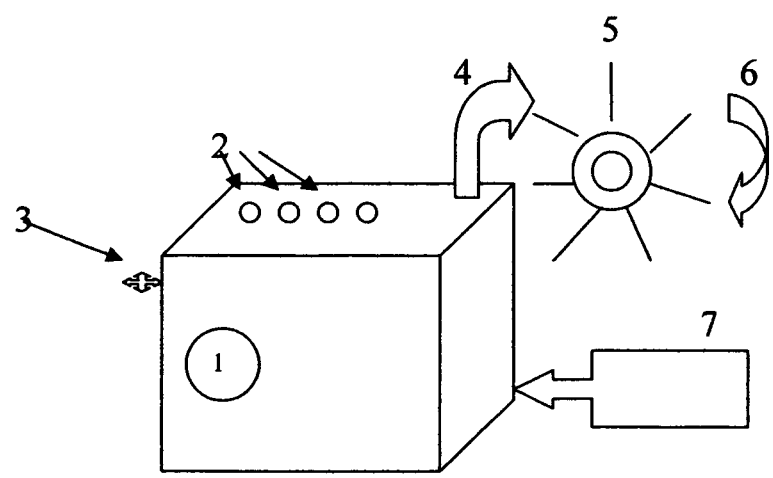
Fig 1: Steam Generation Chamber and Turbine Arrangement

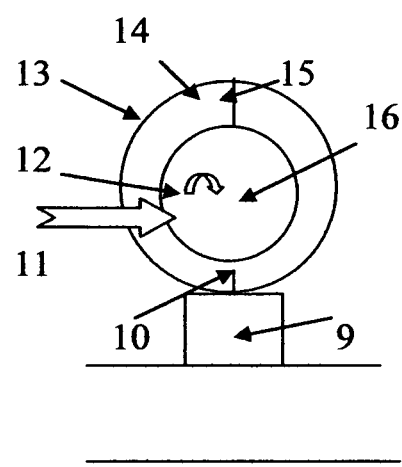
*Fig 2: Convex Lens Frame and Mount Arrangement*

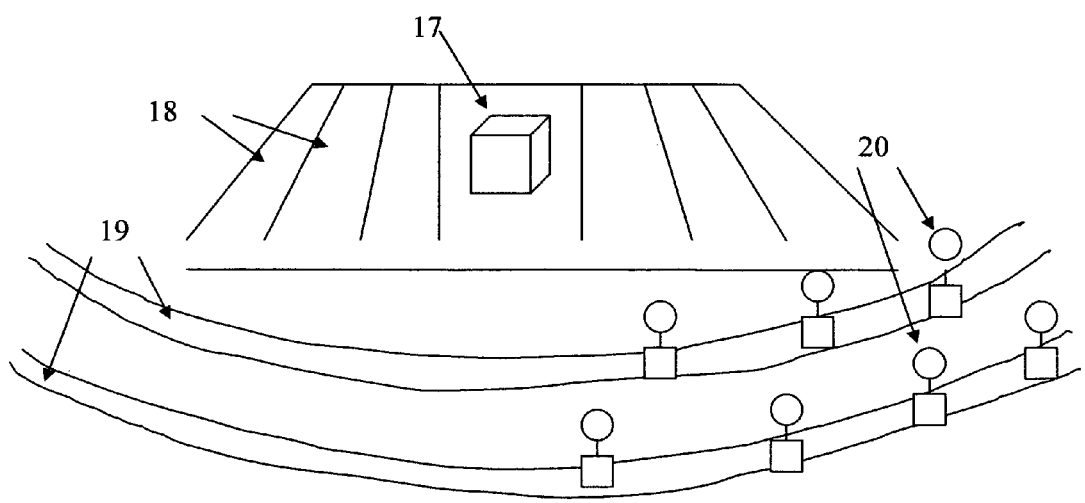
*Fig 3: Rails supported on frames around the roof slide AGV Lenses to focus beams on Steam Chamber*

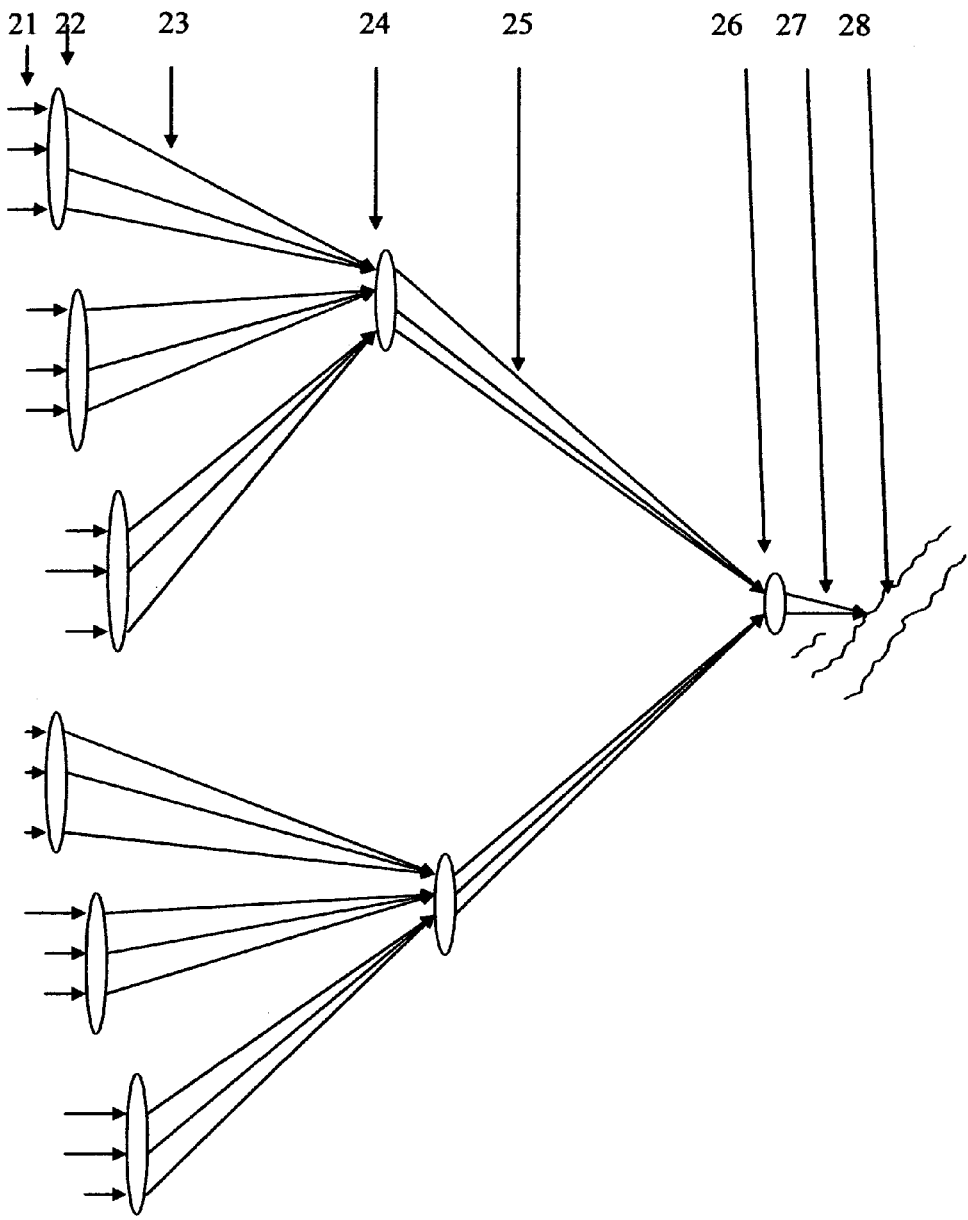
*Fig. 4: Three level hierarchy of lenses in a multi-tier arrangement: each higher level feeds the immediately next lower level, and the lowest level lenses are mounted on the steam chamber that focus light beams on water for heating*

SYSTEM AND METHOD TO GENERATE ENVIRONMENT-FRIENDLY POWER BY TAPPING SOLAR ENERGY

This is the formal patent application for Disclosure Document, deposited with USPTO vide Number 549448 dated Mar. 22, 2004.

This invention describes a system and method to tap solar energy for power generation. The main components of this system are: a steam chamber mounted with convex lenses, external convex lenses that feed the convex lenses mounted on steam chamber, nozzle tube with jet outlet for steam release to impact the turbine blades, turbine with rotor shaft and blades, power generator coupled to the turbine shaft, hot water collection and return arrangement, and safety steam release valves.

The system functions as below:
(1) The external convex lenses focus solar energy collected to the small convex lenses mounted on the steam chamber.
(2) This enables heating of the water inside steam chamber. The steam so generated is released through a nozzle that terminates to a jet.
(3) The jet steam outlet impacts the blades attached to turbine shaft.
(4) Turbine shaft movement allows an attached generator to produce electricity.

Solar Lens Powered Steam Turbine: An insulated container having boiling water inside and convex-lenses mounted on the cover emits steam through a pointed jet to drive turbine blades with a significant force. Over the greater solar catchments area in space around the container, larger convex lenses gather solar energy and beam focused light to comparatively smaller convex lenses mounted on the container. These smaller lenses act as energy amplifiers and send sharp light energy beams suitable to super-heat water inside the container. The steam so generated passes through a directed tube and is fed to the jet nozzle that releases it at a significant velocity to impact the turbine blades. A generator coupled to the turbine rotor shaft produces electricity to charge batteries, run appliances, heat or cool homes or offices as required, and feed extra power to the community grid. The steam, upon utilization and condensation is recycled, while still as very hot water, back to the steam chamber using a water return arrangement. Thus, the only external ingredient required, to power this solar turbine, is direct sunlight. This turbine generator can be a supplementary power source to solar panels in a typical roof-mounted arrangement. A simple mechanism to allow margin for lens shifts would help absorb the wind pressure under extreme weather conditions.

The steam chamber itself can be optionally pivot mounted to stay in focus of the larger lenses mounted around it. The whole arrangement can work in synchronization, controlled by a microprocessor that monitors the sun direction, guides the AGVs (Automatic Guided Vehicles), tilts, and rotates the pivot-mounted steam chamber for optimum performance of the system. Steam temperature, pressure, and other parameters can be monitored to ensure safety, and issue alerts in case of a failure or emergency, and reminders for maintenance/repair.

On a larger scale, floating platforms can tap the solar energy in this manner over the oceans and off-shore steam chambers with associated turbine generators can electrically charge the high-performance batteries placed in remote controlled/self-guided pilot-less transport vessels that can deliver electric charges to the shore by store and transfer mechanism. Once on the shore, the charges from these transportation vessels can replenish Electric Vehicles, create Hydrogen for fuel cells, or fed to the grid.

When implemented for power generation, it is a 100% environment-friendly alternative with zero emission/waste, as compared to contemporary ways of power generation by nuclear and coal-fired thermal plants that pollute the environment and consume half of the nation's water supply. This system can be highly effective, cheap, and the power generated is clean. It neither depletes the nature's resources by burning any fossil fuels and nor does it produce any emissions.

This is just one of the ways by which we can save the environment. Several initiatives to generate power by tapping the locally available natural resources can be combined to achieve the net effect of 'environmental restoration.'

Environment Restoration Algorithm:
(1) To ascertain the impact of a specific pollutant, consider a population size of 100 people who require x units of energy to meet their daily living and working needs. Given that the environment-friendly power generation systems that do not create any poisonous gases or radioactive waste to generate x units of power produce y1 amount of Carbon Dioxide during the process of generation. The human respiration process produces y2 amount of Carbon Dioxide. The amount of existing green cover converts y3 amount of Carbon Dioxide to Oxygen using the photosynthesis process. If $y3>(y1+y2)$, additional green cover may not be required.
(2) However, if $y3<(y1+y2)$, additional green cover would be required to compensate for the fall-short in conversion. Since global wind currents quickly disseminate the impact of any local environment degradation or improvement, the benefits of sacrifice in comfort and effort spent at self-sufficiency in 'need based' power generation and usage would be hard to sustain for any community. Finally, a revolution arising out of a global concern for the environment would lead to voluntary replication of such power generation models with innovative modification suited to local needs. The best approach may integrate such alternatives as supplemental to existing, conventional, and evolving power systems.
(3) Net Carbon Dioxide Environmental Impact=$\Sigma((y3-(y1+y2)+z)$ for all geographic areas under consideration, where z is the pollution from conventional power sources, as apportioned.

This invention can transform the attitude of a global society towards how we generate and use power. In the new paradigm, the levels of prosperity of a nation or community would not be measured by the levels of power consumption, but by new standards of 'how much' did they contribute to restoration (or repair) of the global environment. This attitudinal shift has now become a necessity in view of the current health of our planet. Right from shifting a row of low-efficiency 40-watt bulbs over the mirror in bathroom to a single high-lumen 15-watt lamp and retiring all vegetable peels to a biomass pit in the backyard, small efforts can go a big way in solving the global power and environment problems. Effective ways at power generation, efficient appliances, avoidance of wastage, point of requirement generation for local usage, minimization of losses, and a different life style are all but different steps that collectively contribute to a solution. Reaching out to the world, this research project would bring education for masses to cultivate a higher level of responsibility towards the environment.

Specific geographical areas in United States have varying natural potentials and population distribution. For instance, in Florida, given the potential of the sunshine, possibility of implementing such turbines powered by solar lens steam is endless. For each specific region with sunshine potential in United States and the world over, new technology alternatives, such as this invention, need careful consideration and application to generate power.

Since global air currents quickly carry the pollution across national boundaries and oceans, the impact of this invention is likely to be a trendsetter for further research and development in power generation and usage with a paradigm shift in attitude. This shift is a change from hitherto solutions that have focused on minimizing the damage, to the new wave focused on restoration of the environment with a net positive impact.

BACKGROUND OF THE INVENTION (1) Field of Invention: Environment-friendly power generation by tapping the nature's resource.
(2) Present Invention relates to a system and method for tapping the solar energy to generate power.

BACKGROUND ART (1) A number of inventions exist to tap the natural resources like water and air. Wind turbines capture the energy of blowing wind. Hydropower generation has been pioneered with a variety of turbine systems. Solar energy is also tapped by solar cells. The present invention relates to power generation by tapping solar energy by use of a solar lens powered steam turbine. In another pioneering effort, recent endeavor to achieve power generation by tapping the gravitational energy is appreciable (U.S. Pat. No. 6,981,376 dated Jan. 3, 2006). Efforts are also underway to tap natural resources in combination with other untapped energy sources that are normally wasted (U.S. Pat. No. 6,981,377, dated Jan. 3, 2006).
(2) Demarest (U.S. Pat. No. 3,822,692 dated Jul. 9, 1974) describes a plurality of lenses directing heat at a conducting tube. Ou (U.S. Pat. No. 7,089,740, dated Aug. 15, 2006) describes an ammonia or similar liquid heated from natural sources to generate power as a suggested replacement for fossil fuel. Branover (U.S. Pat. No. 4,191,901, dated Mar. 4, 1980 describes solar power to electricity conversion using a magnetohydrodynamic generator.
(3) There is no invention in the area of generating power by multi-layered solar lens-powered steam turbine. Given the vast geographical areas that have sunny climate, this invention is likely to help human society to restore the damaged environment by generating environment-friendly power.
(4) Patents referenced:

U.S. Pat. No. 6,981,376 dated Jan. 3, 2006
U.S. Pat. No. 6,981,377, dated Jan. 3, 2006
U.S. Pat. No. 3,822,692, dated Jul. 9, 1974
U.S. Pat. No. 7,089,740, dated Aug. 15, 2006
U.S. Pat. No. 4,191,901, dated Mar. 4, 1980

SUMMARY OF THE INVENTION (1) The present invention describes a system and method for an apparatus to generate environment-friendly electricity by utilization of the potential of sunshine.
(2) The sunshine is utilized to boil the water and thereby tap the pressure exerted by steam to generate power.
(3) The system for power generation uses a solar lens powered turbine and supporting devices for tapping the energy of sunshine, and associated methods to achieve the power generation functionality.
(4) Alternative arrangements are possible to mount the lenses at various levels in a multi-tier arrangement, and to mount the steam chamber, as suitable to specific conditions of a given environment and sunshine availability.
(5) Steam generation from water in the steam chamber happens by light directed from solar lenses. Solar lens of a lower level is mounted at focal point of immediately higher level, in such a manner that it can collect light energy from different lenses.
(6) The turbine rotor speed and temperature, steam chamber pressure and temperature, atmospheric pressure and temperature, are continually monitored by means of sensors appropriately installed in respective apparatus. These inputs are fed to a processor for monitoring. This ensures safety, generates alerts for any abnormal situations, and monitors overall system performance to be within predictable limits.

Brief description of the figures enclosed:
(1) FIG. 1 describes the overall system concept, with all major components, like the steam chamber with lenses mounted on it, turbine, water collection and return arrangement.
(2) FIG. 2 describes the simple lens mounting arrangement with frame to deviate wind pressure.
(3) FIG. 3 describes the rail slides with AGV (Automated Guided Vehicle) mounted lenses. These lenses direct light beams to smaller lenses mounted on the steam chamber.
(4) FIG. 4 describes light energy tapping by use of lenses in a multi-tier arrangement at three levels. The higher level lenses direct light to next, lower level smaller lens.

Description of the preferred embodiment (referenced numerals in drawings): Steam generation chamber 1 has small convex lenses 2 mounted directly on the chamber. Emergency steam release valve/fuse assembly 3 is also mounted on the chamber. The steam release tube/jet 4 is used to release the steam, which impacts the turbine with blades 5, enforcing turbine motion 6. The hot water collection and return 7 enables the collection of condensed steam, and its return to the steam generation chamber 1. For achieving the lens placement immediately higher than the ones mounted directly on the steam chamber, and depending on the facility infrastructure and roof layout where the steam chamber is mounted, convex lens frame and mount arrangement can typically be used. A mount/slide rail 8 has controlled AGV/s 9 move on it. For each lens mounting, Vertical mount hinges lower 10 and upper 15 enable the mount support to withstand the wind pressure 11 that can cause a rotary shift 12. The fixed frame 13 enables holding of the rubber seal 14 that let the convex solar lens 16 to adjust to wind pressure and also provides a cushion for the lens.

In a typical layout, the steam chamber 17 can be augmented with roof top solar panels 18. AGV slide rail/s 19 enables the controlled movement of AGV/s 20 that supports the frames of Lenses to focus beams on steam chamber's lower level lenses.

In a three level hierarchy of lenses in a multi-tier arrangement, each higher level feeds the immediately next lower level, and the lowest level lenses are mounted on the steam chamber that focus light beams on water for heating. Sun rays 21 falling on the highest tier lens 22 (there are only three tiers in the drawing example) get focused as beam 23 directed from highest tier lens to next in hierarchy lower level lens, which is the second tier lens 24 in the drawing example. Focused beam 25 is directed from second tier lens to next in hierarchy lower level lens, which is the lowest level lens 26, directly mounted on the steam chamber.

Focused beam 27 is directed from lowest tier lens to liquid inside the chamber 28, resulting in liquid heating and evaporation by temperature rise through focused light beams. This results in production of steam. The steam release tube/jet 4 is used to release the steam, which impacts the turbine with blades 5, enforcing turbine motion 6 and the generator motor coupled to turbine shaft generates electricity. Multiple turbines can be used by adding steam release mountings on the chamber. The excessive steam generation, if beyond the capacity limits of the system, is monitored for safety limits, and released by emergency steam release valve/fuse assembly 3.

ADVANTAGES OF THE INVENTION (1) Power generation is an integral part of human progress, and our relationship with nature and environment. An adverse impact on the environment results in extinction of living organism. A number of species that survived so far are now endangered. The fossil fuels are fast depleting, and burning causes the emission of harmful gases. Conventional power generation plants consume half of the nation's water supply. In view of the imminent global warming threat, Arctic region is likely to melt, and ocean levels will rise globally, risking lives of millions of inhabitants along the shoreline. More severe hurricanes are likely to result from global warming. There is an urgent need to take action, with focus on generating power with environment-friendly techniques, and restoration of the damaged environment. This invention addresses these environmental issues.

(2) The impact of this invention on society is widespread and global. The greenhouse effect and global warming are serious issues facing the human society. This invention will not only help in the protection of environment, but if adapted on a global scale, it even holds the potential to benefit society in environmental restoration. Lot of damage has been caused to global environment in the name of industrialization, over the past hundred years. Some of the damaged environment can be restored with this invention.

(3) While hydro is a perennial source of energy, there are issues with rehabilitation of populations, and the wildlife habitat that is permanently damaged by submergence. Nuclear waste disposal is not only a major concern from environmental hazard consideration, as material remains radioactive for a million years; storage sites are potential targets for terrorist strikes to unleash havoc. Time has now come to apply the technology to develop alternatives to conventional means of generating and using power and study the impact of these alternatives on human society and environment of our planet. While a harsh realization of the environmental threat holds the potential to bring people across the globe to a common platform of agreement, it is not only the effective use of technology to generate power but also the ways we use and waste power and water that need consideration. This invention is an application of technology to help humanity and restore the damaged environment.

(4) Affordable energy is needed to power homes, offices, factories, vehicles, appliances, and gadgets. Technically speaking, everything runs on power. This invention will help human society to generate environment-friendly power by tapping sunshine in a cost-effective manner. It would also enable us to think further in the direction of using nature's resources in an environment-friendly manner for benefit of human society in a way that does not adversely affect the wildlife and their natural habitats.

What is claimed is:

1. A system for power generation using a multi-layered solar lens turbine where steam generation from liquid in the steam chamber happens by light directed from solar lenses, comprising of multiple layers of convex lenses, the number of layers depending on scale and suitability of the infrastructure, and each higher layer containing more lenses than the lower layer, where solar lens of a lower level is mounted to position at focal point of immediately higher level lens, in such a manner that it can collect light energy from higher level lenses, where as higher layer lenses focus their collected solar energy as a beam to the corresponding immediately lower layer lenses, the lowest layer lens is directly mounted on the chamber containing boiling water or another suitable liquid, the arrangement of multi-layered lenses focus solar energy on the liquid inside the chamber to raise the liquid temperature such that steam formation takes place, steam is directed through a nozzle, and in case of an excessive pressure built in the chamber the safety release valves activate to release the steam, steam impacts turbine blades when released from the nozzle, turbine is coupled to a generator that produces electricity upon movement, and the condensed steam is released to the boiling liquid chamber for reuse.

2. The system in accordance with claim 1, wherein the small convex lenses at level 1 on the steam generation chamber with hot liquid collection and return can be mounted in either fixed or auto-adjust configurations, and that the auto-adjust mounting configuration being suitable for synchronized operation with larger lens at level 2 photo-adjustable mounting on Automated Guided Vehicles or by other supports along roof periphery or other mounting locations.

3. The system in accordance with claim 2, wherein an alternative to auto-adjustment of lenses is a steam generation chamber with hot liquid collection and return mounted on a rotate-able pedestal pivot that is system-synchronized to adjust its position with reference to level 2 and higher-level convex lenses to optimize the collection of solar heat.

4. The system in accordance with claim 2, wherein the highest-level convex lenses be mounted on structures around the roof on which turbine is positioned, with placement such that their motion and angles are synchronized with those of corresponding lower level lenses on a one on one basis to gain maximized tapping of solar heat.

5. The system in accordance with claim 1, wherein the steam generation chamber with hot liquid collection and return is fitted with multi-way emergency steam release fuse valves and a steam release tube that terminates to a jet suitable for releasing steam to impact the turbine.

6. The system in accordance with claim 1, wherein the solar turbine comprises of convex lenses at various tier levels, steam generation chamber with liquid return, turbine, turbine enclosure, hot liquid collection and return conduit, and emergency steam release valves.

7. The system in accordance with claim 1, wherein the enclosing cover facilitates collection of hot liquid after steam impact on the turbine, and its return to the steam generation chamber.

8. The system in accordance with claim 1, wherein the hot liquid return is governed by level sensors mounted in the steam chamber and the liquid collection and return chamber, and is managed through a non-return valve that allows only a one-way regulated flow to prevent back-flow of hot liquid from steam chamber to the enclosure's liquid collection and return chamber, and that the excess hot liquid is held in a collection bin.

9. The system in accordance with claim 2, wherein the level 2 convex lenses can be mounted along periphery of the roof or on other support structure, and in case of roof periphery mounting the lens mounts slide on a rail, and their motion controlled by synchronized Automated Guided Vehicles to optimize lens placement for maximizing solar heat.

10. The system in accordance with claim 1, wherein the level 2 convex lens frame mounting in a multi-tier configuration can consist of a fixed frame with rubber seals and vertical mounting hinges to facilitate the shift while withstanding the wind pressure to avoid infrastructure damage, and this frame is supported on the Automated Guided Vehicle that moves on a sliding rail.

11. The system in accordance with claim 1, wherein the slide rail on roof can be installed at multiple levels, as suitable to the conditions of specific roof structure.

12. The system in accordance with claim 3, wherein the steam generation chamber can be optionally pivot mounted or on flat bed, such that multiple tiers of convex lenses and Automated Guided Vehicles are synchronized and managed by a processor that monitors the sun direction, guides the Automated Guided Vehicles, and tilts and rotates the steam generation chamber for optimal performance.

13. The method in accordance with claim 1, wherein the steam pressure, temperature, and hot liquid level are continually monitored by means of sensors installed in the steam generation chamber, and these sensor inputs are fed to a processor that ensures safety, and generates alerts for any upcoming abnormal situations as predicted.

14. The method in accordance with claim 1, the steam turbine is connected to a power generator that produces electricity.

15. The system in accordance with claim 1, wherein if there are more than three tiers of convex lenses, the higher tier lenses can be mounted on vehicles floating in space, tethered balloons, or other supported structures, and the movement of lower tier lenses synchronized to match their motion.

\* \* \* \* \*